United States Patent Office 3,577,423
Patented May 4, 1971

3,577,423
1,4-BIS-(3-INDOLEGLYOXYLOYL) PIPERAZINES AND DERIVATIVES THEREOF
John L. Archibald, Malvern, and Meier E. Freed, Philadelphia, Pa., assignors to American Home Products Corporation, New York, N.Y.
No Drawing. Original application Dec. 3, 1965, Ser. No. 511,362, now Patent No. 3,471,499, dated Oct. 7, 1969. Divided and this application June 26, 1969, Ser. No. 844,717
Int. Cl. C07d 57/100
U.S. Cl. 260—268                 14 Claims

ABSTRACT OF THE DISCLOSURE

The compounds are 1,4-bis-(3-indoleglyoxyloyl)piperazines. Said compounds are useful as intermediates in the preparation of corresponding 1,4-bis(2-indol-3-yl-ethyl)piperazines and their salts, which are pharmacologically active as hypotensives.

---

This application is a division of U.S. Ser. No. 511,362, which was filed on Dec. 3, 1965, and is now U.S. Patent No. 3,471,499 granted Oct. 7, 1969.

This invention relates to chemical compounds that are derivatives of piperazine, and, more particularly, to 1,4-bis-(2-indol-3-yl-ethyl)-piperazines, their salts, and method of producing them.

The compounds of the invention, in the form of the free bases, may be represented by the general formula:

I.

[Structural formula showing two indole rings connected via Z—N...N—Z' linkage through a piperazine ring with substituents R, R¹, R², R³, R⁴, R⁵, W, W', X, X', and $(CN_2)_n$]

wherein R, R¹, R² and R³ each may be hydrogen or lower alkyl, and adjacent R and R¹ or R² and R³ may be joined so as to form a second ring; $n$ may be an integer from 0 to 1; Z and Z' each may be glyoxyloyl or an alkylene chain of either two or three carbons and which may be optionally substituted by lower alkyl either adjacent to the indole moiety or to the junction with the piperazine ring; R⁴ and R⁵ each may be hydrogen or lower alkyl; W and W' each may be hydrogen, lower alkyl or aralkyl; and X and X' may be hydrogen, alkyl, alkoxy, halogen, trihalomethyl or hydroxy.

It has been discovered that compounds of this invention meeting the described qualifications whether as free bases or the acid-addition salts thereof, demonstrate at least one, but often multiple pharmacological activities, when Z and Z' of Formula I above are selected to be alkylene. Thus, said compounds of this invention have been found to be useful for their pharmacological activity as hypotensives and/or central nervous system depressants. Compounds of the invention meeting said qualifications, but having Z and Z' of said Formula I above as glyoxyloyl, have been found to be valuable intermediates useful for preparing said compounds of the invention which have the stated pharmacological activities.

In preparing the piperazine derivatives of the present invention, the free bases may most generally and conveniently be prepared by preparing, from a suitable indole and oxalyl chloride, the corresponding gloxyloyl chloride, and then reacting with the resulting 3-indolyl gloxyloyl chloride, the piperazine derivative, in an inert organic solvent; to obtain the desired 1,4-bis(indolylgloxyloyl)piperazine derivative. Said derivative may then be reduced by conventional means, such as the use of lithium aluminum hydride, to obtain the desired final compounds of the invention. Alternatively, the 3-indolylalkyl carboxylic acid may be reacted directly with a suitable piperazine derivative (optionally in the presence of dicyclohexylcarbodimide) and the resulting 1,4-bis(indolylgloxyloyl)piperazine derivative again reduced to the resulting desired compound of the invention by conventional means, as in the first referred-to method. In certain instances, the compounds of the invention may be prepared by reacting an N,N-bis(indol-3(lower)alkyl)alkylenediamine with oxalyl chloride to result in ring closure with the formation of a 2,3-diketo piperazine derivative, which may then be reduced to the desired compounds of the invention with conventional reduction catalysts. In accordance with the invention, the alkylenediamine intermediate may consist of an ethylene or propylene chain with an alkyl substitution on one of the carbon atoms thereof so as to result in such substitution on the resulting piperazine nucleus. Instead of utilizing oxalyl chloride; chloroacetylchloride, or the corresponding ethyl ester, may be utilized for obtaining a 2-ketopiperazine nucleus with also the possibility of a 3-alkyl substituent thereon by utilizing, as the chloroacetylchloride or corresponding ethyl ester, one having the desired alkyl substitution on the α carbon atom thereof. The compounds of the invention may also be prepared by reaction of an indol-3-yl ethyl halide or sulfonic acid ester with piperazine. In certain instances, the compounds of the invention may be prepared by utilization of the Fisher indole-synthesis reaction by employing a 1,4-bis(4-ketopentyl)-piperazine with phenylhydrazine (or a ring substituted derivative thereof) under reducing conditions, to result in the compounds of the invention, wherein R⁴ and R⁵ are methyl-substituted, and X and X' may each be the substituent furnished by the phenylhydrazine reactant. Substituents W and W' may be introduced after compound formation by alkylation of the sodium salt of said compound.

The routes of preparation described above are indicated schematically below, wherein, in all cases "Ind-" represents indol-3-yl.

1. Ind-H $\xrightarrow[\text{Oxalyl Chloride}]{\text{Cl}-\overset{\text{O}}{\text{C}}-\overset{\text{O}}{\text{C}}-\text{Cl}}$ Ind-$\overset{\text{O}}{\text{C}}-\overset{\text{O}}{\text{C}}$-Cl $\xrightarrow{\text{Piperazine}}$ [Ind-$\overset{\text{O}}{\text{C}}-\overset{\text{O}}{\text{C}}-\text{N}\diagup\overset{\text{CH}_2-}{\text{CH}_2-}$]₂ $\xrightarrow{\text{LiAlH}_4}$ 2. Ind-CH₂CO₂H or Ind-CH₂—COCl $\xrightarrow[\text{Piperazine}]{\text{(Dicyclohexyl-carbodimide)}}$ Ind-CH₂C—N$\diagup$N—$\overset{\text{O}}{\text{C}}$—CH₂-Ind $\xrightarrow{\text{LiAlH}_4}$ Ind-CH₂CH₂N$\diagup$N—CH₂CH₂-Ind

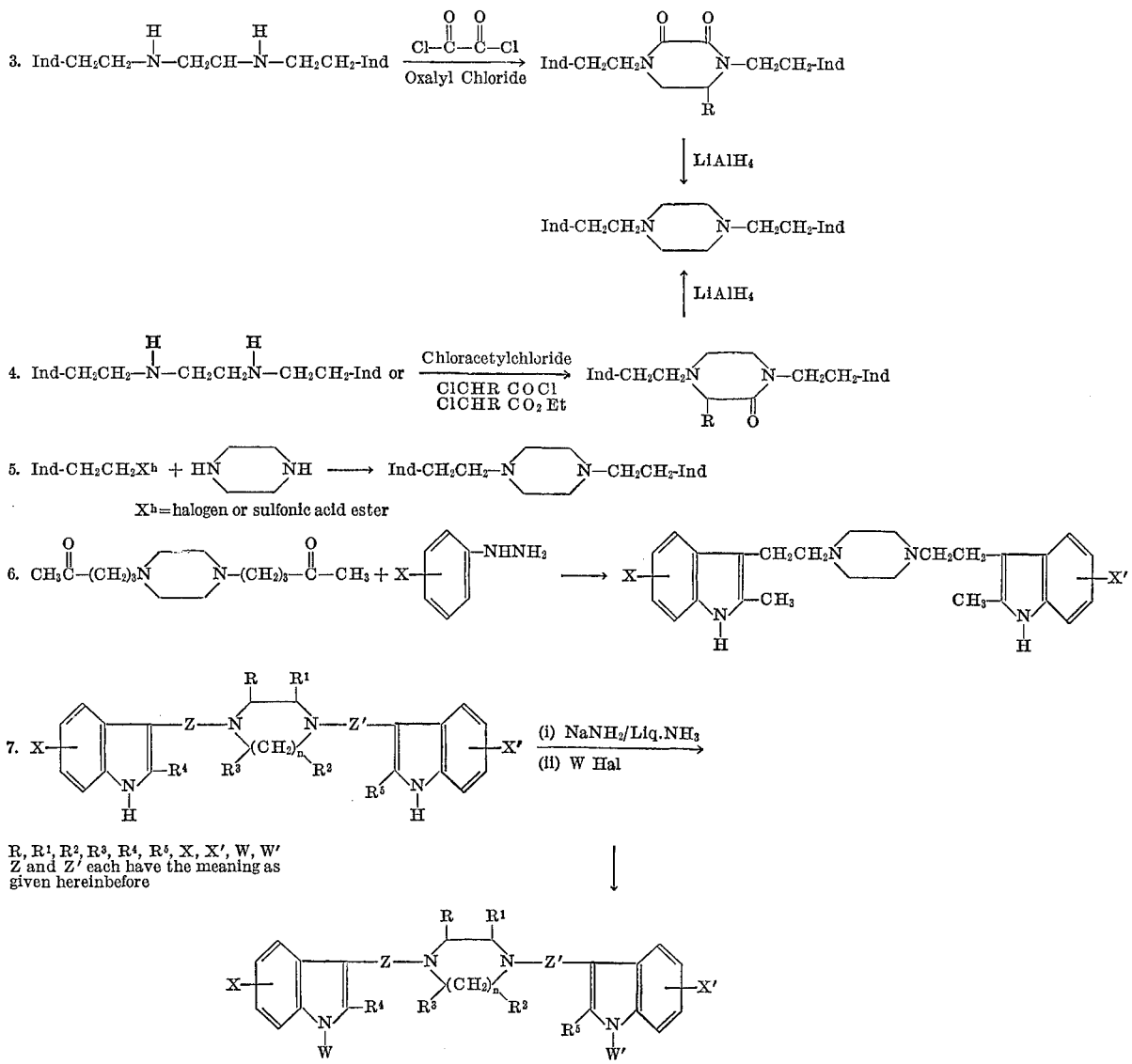

Many of the reactants employed in the processes of this invention are known compounds which are readily available from commercial sources. Others which are not commercially available can be prepared in accordance with standard organic procedures which are known to those skilled in the art.

Compounds falling within the scope of the formula as given above, may be used in the form of their acid-addition salts while still retaining their pharmacological effectiveness. The salts provide great flexibility in therapeutic use since they may impart various degrees of water-solubility to an otherwise substantially insoluble base. With regard to the acid-addition salts, as is well known in the pharmaceutical art, either organic or inorganic acids may be used as long as they do not substantially increase the toxicity of the compounds. For example, the compounds which are useful as bases per se may be used in the form of their salts with suitable organic acids including acetic, propionic, tartaric, citric, and the like, or inorganic acids including hydrochloric, hydrobromic, sulfuric, phosphoric, and the like.

The acid-addition salts may be prepared by procedures now well known to those skilled in the art. For example, a selected novel free base of the invention may generally be dissolved in a suitable solvent and the selected acid may then be added thereto. Since the preparation of acid-addition salts is well known, it need not be described in any greater detail here.

When the compounds of the invention are employed as hypotensives and/or central nervous system depressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules which may contain conventional excipients, or in the form of solutions; or they may be injected parenterally, that is intramuscularly, intravenously or subcutaneously. For parenteral administration they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about .05 mg. to about 15 mg. per kg. of body weight per day, although as aforementioned variations will occur. However, a dosage level that is in the range of from about 0.2 mg. to about 5 mg. per kg. of body weight per day is most desirably employed in order to achieve effective results.

The following examples are given by way of illustration.

EXAMPLE I

(a) 1,4-bis(3-indoleglyoxyloyl)-piperazine

Piperazine (2.6 g. in dry 1,2-dimethoxyethane (100 ml.) was stirred while 3-indoleglyoxyloyl chloride (4.2 g.) in 1,2-dimethoxyethane (25 ml.) was added dropwise. The resulting precipitate was collected, suspended in water and stirred for 30 min. then collected again, washed well with water and dried to give 4.3 g. of a colorless solid, M.P. 360. Two recrystallizations from dimethylformamide-water gave the product, M.P. 360°.

Analysis.—Calcd. for $C_{24}H_{20}N_4O_4$ (percent): C, 67.28; H, 4.71; N, 13.08. Found (percent): C, 66.69; H, 4.67; N, 13.24.

(b) 1,4-bis(2-indol-3-ylethyl)piperazine

Compound (a) (1.0 g.) was suspended in dry 1,2-dimethoxyethane (100 ml.) and lithium aluminum hydride (1 g.) was added. The mixture was stirred and refluxed for 24 hrs. then cooled in an ice bath. Excess lithium aluminum hydride was decomposed by the dropwise addition of water. The granular inorganic material was filtered off and the filtrate was evaporated in vacuo to give a colorless oil with strong blue fluorescence. The oil crystallized on scratching and was recrystallized from ethanol-water to provide the product as colorless needles (0.6 g.) M.P. 196-7°.

Analysis.—Calcd. for $C_{24}H_{28}N_4$ (percent): C, 77.38; H, 7.58; N, 15.04. Found (percent): C, 77.12; H, 7.60; N, 14.81.

EXAMPLE II

(a) Hexahydro-1,4-bis(3-indoleglyoxyloyl)-1H-1,4-diazepine

Homopiperazine was treated with 3-indoleglyoxyloyl chloride in 1,2-dimethoxyethane in the same way as in Example I(a). Recrystallization of the crude material from aqueous dimethylformamide gave the product as colorless microprisms M.P. 330° (decomp.).

Analysis.—Calcd. for $C_{25}H_{22}N_4O_4$ (percent): C, 67.86; H, 5.01; N, 12.66. Found (percent): C, 67.95; H, 5.19; N. 12.63.

(b) Hexahydro-,4-bis(2-indol-3-ylethyl)-1H-1,4-diazopine

The compound of Example II(a) was reduced with lithium aluminum hydride in refluxing 1,2-dimethoxyethane as in Example I(b) and worked up in the same way to give the crude product as a colorless oil. The oil was dissolved in ether, filtered and cooled in an ice-bath. Ethereal hydrogen chloride was added until just acid and the precipitated hydrochloride was collected. It was converted back to the base by stirring with chloroform-10% sodium hydroxide solution. The chloroform layer was washed, dried, and evaporated and the resulting foam was crystallized from benzene. Recrystallization from benzene, then from ether, gave the product, M.P. 107–8°.

Analysis.—Calcd. for $C_{25}H_{20}N_4$ (percent): C, 77.68; H, 7.82; N, 14.50. Found (percent): C, 77.58; H, 7.81; N, 14.33.

EXAMPLE III

(a) 1,4-bis(3-indoleglyoxyloyl)-trans-2,5-dimethylpiperazine

A solution of 3-indoleglyoxyloyl chloride (20.8 g.) in 1,2-dimethoxyethane (250 ml.) was added during 10 min. to a stirred mixture of trans-2,5-dimethylpiperazine (16.8 g.) in 1,2-dimethoxyethane (150 ml.). After standing overnight, the precipitate was collected, washed very thoroughly with water and dried, giving a colorless solid (20 g.) M.P. 358° (d.). Rercrystallization from dimethylformamide gave the product (17.4 g.), M.P. 361–2°.

Analysis.—Calcd. for $C_{24}H_{24}N_4O_4$ (percent): C, 68.41; H, 5.30; N, 12.27. Found (percent): 68.92; H, 5.00; N, 12.17.

(b) 1,4-bis(2-indol-3-ylethyl)-trans-2,5-dimethylpiperazine

The foregoing product (15 g.) and lithium aluminum hydride (7.5 g.) in dry 1,2-dimethoxyethane (500 ml.) was stirred under reflux for 18 hr. then cooled in an ice bath and decomposed with water (25 ml.). The mixture was filtered and the filtrate was evaporated. Recrystallization of the residue from N,N-dimethylacetamide provided the product (10.0 g.) M.P. 202–4°.

Analysis.—Calcd. $C_{26}H_{32}N_4$ (percent): C, 77.79; H, 8.05; N, 13.99. Found (percent): C, 77.72; H, 7.98; N, 13.82.

EXAMPLE IV

(a) 1,4-bis(3-indoleglyoxyloyl)-cis-2,5-dimethylpiperazine

This compound was prepared from cis-2,5-dimethylpiperazine and 3-indoleglyoxyloyl chloride by a procedure similar to those used in Examples I(a), II(a), and III(a). After two recrystallizations from N,N-dimethylacetamide-water, the product had M.P. 337–9° (decomp.).

(b) 1,4-bis(2-indol-3-ylethyl)-cis-2,5-dimethylpiperazine

Reduction of the foregoing product was carried out in essentially the same way as in the previous examples. The crude material was recrystallized first from ether, then from aqueous ethanol, to give the product as colorless prisms M.P. 157–8°.

Analysis.—Calcd. for $C_{26}H_{32}N_4$ (percent): C, 77.96; H, 8.05; N, 13.99. Found (percent): C, 77.47; H, 8.00; N, 14.11.

EXAMPLE V

The procedures of Example I(a) and (b) are repeated utilizing each of the following indoleglyoxyloyl halide derivatives as reactants for separate reaction with piperazine, followed by reduction in the presence of lithium aluminum hydride to produce the hereinafter listed products, respectively:

| Reactants | Product |
| --- | --- |
| 7-chloroindol-3-ylgloxyloyl chloride. | 1,4-bis(7-chloro-2-indol-3-ylethyl)-piperazine. |
| 5-ethoxyindol-3-ylgloxyloyl chloride. | 1,4-bis(5-ethoxy-2-indol-3-ylethyl)-piperazine. |
| 6-hydroxyindol-3-ylgloxyloyl chloride. | 1,4-bis(6-hydroxy-2-indol-3-ylethyl)piperazine. |
| 6-trichloromethylindol-3-ylgloxyloyal chloride. | 1,4-bis(6-trichloromethyl-2-indol-3-ylethyl)piperazine. |
| 2-ethylindol-3-ylgloxyloyl chloride. | 1,4-bis(2-ethyl-2-indol-3-ylethyl)-piperazine. |
| 1-propylindol-3-ylgloxyloyl chloride. | 1,4-bis(1-propyl-2-indol-3-ylethyl)-piperazine. |
| 1-phenethylindol-3-ylgloxyloyl chloride. | 1,4-bis(1-phenethyl-2-indol-3-ylethyl)piperazine. |
| 5-propylindol-3-ylgloxyloyl chloride. | 1,4-bis(5-propyl-2-indol-3-ylethyl)-piperazine. |

EXAMPLE VI

1,4-bis(5-methoxyindole-3-glyoxyloyl)-cis-2,5-dimethylpiperazine

The title compound was prepared in the manner of Example IV(a), by utilizing 5-methoxyindole-3-glyoxyloyl chloride in place of 3-indoleglyoxyloyl chloride. Crystallized from aqueous dimethylformamide, the product had an M.P. 297–300° (dec.).

Analysis.—Calcd. for $C_8H_{28}N_4O_6$ (percent): C, 65.10; H, 5.46; N, 10.85. Found (percent): C,64.83; H, 5.39; N, 10.90.

EXAMPLE VII

Using the same general procedure of Example I(a) and (b), as followed in Example VI, the 3-indoleglyoxyloyl halides and piperazine compounds are employed as reactants, and the resulting products reduced to obtain the respective products, as given below:

| Reactants | Final product |
|---|---|
| 2-methyl-indole-3-ylglyoxyloyl- chloride and 2,6-dimethylpiperazine. | 1,4-bis(2-[2-methyl-indol-3-yl] ethyl)-2,6-dimethylpiperazine. |
| 1-methyl-indol-3-ylglyoxyloyl chloride and cis-2-methyl-5-ethylpiperazine. | 1,4-bis(2-[1-methyl-indol-3-yl] ethyl)-cis-2-methyl-5-ethyl-piperazine. |
| 7-methylindol-3-ylglyoxyloyl chloride and cis-2,5-dimethylpiperazine. | 1,4-bis-2-(7-methylindol-3-yl) ethyl-cis-2,5-dimethylpiperazine. |
| 5-bromoindol-3-ylglyoxyloyl chloride and cis-2,5-dimethyl-piperazine. | 1,4-bis-2-(5-bromoindol-3-yl) ethyl-cis-2,5-dimethylpiperazine. |

EXAMPLE VIII

1,4-bis(3-indoleglyoxyloyl)-1,2,3,4-tetrahydroquinoxaline

Following the procedure of Example I(a), 3-indoleglyoxyloyl chloride and 1,2,3,4 - tetrahydroquinoxaline were reacted to form the title compound which was crystallized from aqueous dimethylformamide as a D.M.F. solvate, M.P. 290°.

*Analysis.*—Calcd. for $C_{28}H_{20}N_4O_4 \cdot C_3H_7NO$ (percent): C, 67.75; H, 4.95; N, 12.40. Found (percent): C, 67.77; H, 4.64; N, 12.05.

EXAMPLE IX

1,2,3,4-tetrahydro-1,4-bis[2-(3-indolyl)ethyl]-quinoxaline

Following the procedure referred to in Example VII, the product of Example VIII was reduced to obtain the title compound having an M.P. 175-6°.

*Analysis.*—Calcd. for $C_{28}H_{28}N_4$ (percent): C, 79.96; H, 6.71; N, 13.32. Found (percent): C, 79.98; H, 6.81; N, 13.62.

EXAMPLE X

1,4-bis(2-methylindole-3-glyoxyloyl)piperazine

Using the procedure of Example I(a), 2-methylindole-3-glyoxyloyl chloride and piperazine were reacted to obtain the title compound having an M.P. 345-6° (dec.).

*Analysis.*—Calcd. for $C_{26}H_{24}N_4O_4$ (percent): C, 68.41; H, 5.30; N, 12.27. Found (percent): C, 68.38; H, 5.13; N, 12.27.

EXAMPLE XI

1,4-bis[2-(2-methyl-3-indolyl)ethyl]-piperazine

The product of Example X was reduced and the product was crystallized from aqueous dimethylformamide to obtain the title compound, having an M.P. 240-243°.

*Analysis.*—Calcd. for $C_{26}H_{32}N_4$ (percent): C, 77.96; H, 8.05; N, 13.99. Found (percent): C, 77.54; H, 8.27; N, 13.76.

EXAMPLE XII

1,4-bis(2-methylindole-3-glyoxyloyl)cis-2,5-dimethylpiperazine

Following the reaction procedure, as in Example X, but substituting cis-2,5-dimethylpiperazine for piperazine, the title compound was crystallized from aqueous dimethylformamide and had an M.P. 342-3° (dec.).

*Analysis.*—Calcd. for $C_{28}H_{28}N_4O_4$ (percent): C, 69.40; H, 5.83; N, 11.56. Found (percent): C, 69.18; H, 5.79; N, 11.80.

EXAMPLE XIII

1,4 bis[2-(2-methylindolyl)ethyl]-cis-2,5-dimethylpiperazine

The title compound was obtained by reduction of the product of Example XII. The new compound was crystallized from aqueous dimethylformamide as colorless prisms, M.P. 182-208°.

*Analysis.*—Calcd. for $C_{28}H_{36}N_4$ (percent): C, 78.46; H, 8.47; N, 13.07. Found (percent): C, 78.49; H, 8.53; N, 12.87.

EXAMPLE XIV

1,4-bis(3-indoleglyoxyloyl)-2,6-dimethylpiperazine

The title compound was prepared as in Examples I(a), but substituting 2,6-dimethylpiperazine for piperazine. Crystallized from aqueous dimethylformamide, the title compound had an M.P. 342-3° (dec.).

*Analysis.*—Calcd. for $C_{20}H_{24}N_4O_4$ (percent): C, 68.41; H, 5.30; N, 12.27. Found (percent): C, 68.17; H, 5.47; N, 12.36.

EXAMPLE XV

1,4-bis[2-(3-indolyl)ethyl]-2,6-dimethylpiperazine

Obtained by reduction of the compound of Example XIV, the new compound crystallized from ethanol, M.P. 174-6°.

*Analysis.*—Calcd. for $C_{26}H_{32}N_4$ (percent): C, 77.96; H, 8.05; N, 13.99. Found (percent): C, 77.60; H, 8.39; N, 13.62.

EXAMPLE XVI

1,4-bis(3-indoleglyoxyloyl)-2,3,5,6-tetramethylpiperazine

Following the procedure of Example I(a), but utilizing 2,3,5,6-tetramethylpiperazine in place of piperazine. The title compound was obtained and was crystallized from aqueous dimethylformamide as a hemihydrate, M.P. 322-4°.

*Analysis.*—Calcd. for $C_{28}H_{28}N_4O_4 \cdot 1/2H_2O$ (percent): C, 68.16; H, 5.92; N, 11.36. Found (percent): C, 68.29; H, 5.85; N, 11.37.

EXAMPLE XVII

1,4-bis[-(3-indolyl)ethyl]-2,3,5,6-tetramethylpiperazine

The compound of Example XVI was reduced and the resulting product was isolated as fumarate salt, monohydrate, M.P. 80-105°.

*Analysis.* — Calcd. for $C_{28}H_{36}N_4 \cdot C_4H_4O_4 \cdot H_2O$ (percent): C, 68.30; H, 7.52; N, 9.96. Found (percent): C, 68.85; H, 7.47; N, 10.27.

EXAMPLE XVIII

1,4-bis(3-indoleglyoxyloyl)-2-methylpiperazine

The title compound was prepared in the same way as that of Example I(a), but utilizing 2-methylpiperazine in place of piperazine. The compound on crystallization from aqueous dimethylformamide, had an M.P. 348-50° (dec.).

*Analysis.*—Calcd. $C_{25}H_{22}N_4O_4$ (percent): C, 67.86; H, 5.01; N, 12.66. Found (percent): C, 67.62; H, 5.29; N, 12.67.

EXAMPLE XIX

1,4-bis[2-(3-indolyl)ethyl]-2-methylpiperazine

By reduction of the product of Example XVIII, the title compound was obtained. It was recrystallized three times from aqueous ethanol, M.P. 100-107°.

*Analysis.*—Calcd. for $C_{25}H_{30}O_4$ (percent): C, 77.68; H, 7.82; N, 14.50. Found (percent): C, 77.57; H, 7.51; N, 14.25.

EXAMPLE XX

1,4-bis(5-bromoindole-3-glyoxyloyl)-piperazine

The title compound was prepared by the procedure of Example I(a), utilizing 5-bromoindole-3-glyoxyloyl chloride in place of 3-indoleglyoxyloyl chloride. The resulting product was crystallized from aqueous dimethylformamide and had an M.P. >360°.

Analysis.—Calcd. for $C_{24}H_{18}Br_2N_4O_4$ (percent): C, 49.18; H, 3.09; N, 9.66; Br, 27.27. Found (percent): C, 49.15; H, 2.97; N, 9.47; Br, 27.3.

EXAMPLE XXI

1,4-bis-(5-methoxyindole-3-glyoxyloyl)-piperazine

Again following Example I(a), but utilizing 5-methoxyindole-3-glyoxyloyl chloride in place of 3-indoleglyoxyloyl chloride, the title product was obtained and crystallized from aqueous dimethylformamide as a hemihydrate, M.P. 365° (dec.).

Analysis.—Calcd. for $C_{26}H_{24}N_4O_6 \cdot \frac{1}{2}H_2O$ (percent): C, 62.76; H, 5.06; N, 11.25. Found (percent): C, 62.65; H, 5.04; N, 11.47.

EXAMPLE XXII

1,4-bis[2-(5-methoxy-3-indolyl)ethyl]-piperazine

Obtained by reduction of the product of Example XXI, the title compound crystallized from aqueous dimethylformamide, M.P. 210–11°.

Analysis.—Calcd. for $C_{26}H_{32}O_2N_4$ (percent): C, 72.19; H, 7.46; N, 12.95. Found (percent): C, 72.41; H, 7.60; N, 12.86.

EXAMPLE XXIII

1,4-bis[2-(1-methyl-3-indolyl)ethyl]-piperazine

The compound obtained in Example I(b) (7.46 g.) was added to a stirred solution of sodium amide in liquid ammonia (ca. 500 ml.) prepared from sodium (1.10 g.) and liquid ammonia. Methyl iodide (5.8 g.) in ether (100 ml.) was added dropwise to the stirred mixture; then the ammonia was allowed to evaporate overnight. Ether (200 ml.) was added to the residue, followed by water (200 ml. added dropwise at first).

The insoluble material was filtered off and dried to give 5.7 g. A second crop (1.3 g.) was obtained from the ether layer. Two recrystallizations from ethanol gave the title product as colerness needles, M.P. 129–31°.

Analysis.—Calcd. for $C_{26}H_{32}N_4$ (percent): C, 77.96; H, 8.05; N, 13.99. Found (percent): C, 78.22; H, 8.21; N, 14.05.

EXAMPLE XXIV

1,3-bis[2-(1-methyl-3-indolyl)ether]-cis-2,5-dimethylpiperazine

Starting with the product of Example IV(b), the title compound was obtained by the procedure of Example XXIII. It crystallized from hexane as colorless needles, M.P. 81–4°.

Analysis.—Calcd. for $C_{28}H_{36}N_4$ (percent): C, 78.46; H, 8.47; N, 13.07. Found (percent): C, 78.79; H, 8.30; N, 12.82.

EXAMPLE XXV

1,4-bis[2-(1-ethyl-3-indolyl)ethyl]piperazine

Again following the procedure of Example XXIII, but utilizing ethyl iodide in place of methyl iodide; the title compound crystallized from ethanol as colorless prisms, M.P. 125–7°.

Analysis.—Calcd. for $C_{28}H_{36}N_4$ (percent): C, 78.46; H, 8.47; N, 13.07. Found (percent): C, 78.18; H, 8.18; N, 12.82.

EXAMPLE XXVI

1,4-bis[2-(1-benzyl-3-indolyl)ether]piperazine

The title compound was prepared by a procedure similar to that of Example XXIII, by utilizing benzyl bromide in place of methyl iodide. The final product crystallized from ethyl acetate as colorless needles M.P. 158–161°.

Analysis.—Calcd. for $C_{38}H_{40}N_4$ (percent): C, 82.57; H, 7.29; N, 10.14. Found (percent): C, 82.30; H, 7.60; N, 10.43.

EXAMPLE XXVII

1,4-bis[2-(1,2-dimethyl-3-indolyl)ether]-cis-2,5-dimethylpiperazine

Starting with the product of Example XIII, the title compound was obtained by a procedure similar to that of Example XXIII. Crystallized from aqueous dimethylformamide as colorless prisms, the product had an M.P. 176–8°.

Analysis.—Calcd. for $C_{30}H_{40}N_4$ (percent): C, 78.90; H, 8.83; N, 12.27. Found (percent): C, 78.84; H, 9.10; N, 12.01.

EXAMPLE XXVIII

1,4-bis(2-indol-3-ylethyl)piperazine

In an alternative method for the preparation of the compound obtained in Example I(b); a mixture of 3-(2-bromoethyl)-indole (44.8 g.), piperazine (8.6 g.) and diisopropylamine (30.3 g.) in dimethylformamide (200 ml.) was stirred at room temperature for 18 hr. The precipitated diisopropylamine hydrobromide was filtered off and the filtrate was poured into ice-water. A gum formed which solidified on standing and scratching. It was collected, washed, dried and recrystallized to give the product as colorless needles (28.0 g.) M.P. 193–5°.

We claim:

1. A compound of the group consisting of the bases having the formula:

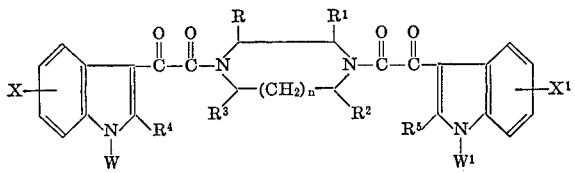

wherein
R, $R^1$, $R^2$ and $R^3$ are each selected from the group consisting of hydrogen and methyl;
$n$ is an integer from 0 to 1;
$R^4$ and $R^5$ are the same and are selected from the group consisting of hydrogen, methyl and ethyl;
W and $W^1$ are the same and are selected from the group consisting of hydrogen, lower alkyl containing from 1 to 3 carbon atoms, phenethyl and benzyl; and
X and $X^1$ are the same and are selected from the group consisting of hydrogen, lower alkyl containing from 1 to 3 carbon atoms, lower alkoxy containing from 1 to 3 carbon atoms, halogen, trihalomethyl and hydroxy.

2. A compound as defined in claim 1 which is: 1,4-bis(3-indoleglyoxylyl)-piperazine.

3. A compound as defined in claim 1 which is: hexahydro-1,4,-bis(3-indoleglyoxylyl)-1H-1,4-diazepine.

4. A compound as defined in claim 1 which is: 1,4-bis(3-indoleglyoxylyl)-trans-2,5-dimethylpiperazine.

5. A compound as defined in claim 1 which is: 1,4-bis-(3-indoleglyoxylyl)-cis-2,5-dimethylpiperazine.

6. A compound which is: 1,4-bis,3-indoleglyoxyloyl)-1,2,3,4-tetrahydroquinoxaline.

7. A compound as defined in claim 1 which is: 1,4-bis(2-methylindole-3-glyoxyloyl)piperazine.

8. A compound as defined in claim 1 which is: 1,4-bis(2-methylindole-3-glyoxyloyl)cis-2,5-dimethylpiperazine.

9. A compound as defined in claim 1 which is: 1,4-bis(3-indoleglyoxyloyl)-2,6-dimethylpiperazine.

10. A compound as defined in claim 1 which is: 1,4-bis(3-indoleglyoxyloyl)-2,3,5,6-tetramethylpiperazine.

11. A compound as defined in claim 1 which is: 1,4-bis(3-indoleglyoxyloyl)-2-methylpiperazine.

12. A compound as defined in claim 1 which is: 1,4-bis(5-bromoindole-3-glyoxyloyl)-piperazine.

13. A compound as defined in claim 1 which is: 1,4-bis-(5-methoxyindole-3-glyoxyloyl)-piperazine.

14. A compound as defined in claim 1 which is: 1,4-bis(5 - methoxyindole - 3 - glyoxyloyl) - cis - 2,5 - dimethylpiperazine.

References Cited
UNITED STATES PATENTS

| | | | |
|---|---|---|---|
| 2,870,162 | 1/1957 | Speeter et al. | 260—288X |
| 2,909,523 | 10/1959 | Bach et al. | 260—268 |
| 3,030,363 | 4/1962 | Konz | 260—268X |
| 3,051,710 | 8/1962 | Biel | 260—268 |
| 3,188,313 | 6/1965 | Archer | 260—268 |
| 3,328,406 | 6/1967 | Wolf | 260—268 |

DONALD G. DAUS, Primary Examiner

U.S. Cl. X.R.

260—239, 250